United States Patent [19]
Suzuki et al.

[11] Patent Number: 5,949,629
[45] Date of Patent: Sep. 7, 1999

[54] CLEANING SYSTEM FOR PROVIDING ADDITIONAL CLEANING FOR ROTATING CYLINDER HEADS

[75] Inventors: Hiroyuki Suzuki, Nara-ken; Kunihiko Hara, Hirakata, both of Japan

[73] Assignee: Matsushita Electric Industrial Co., Ltd., Japan

[21] Appl. No.: 08/939,924

[22] Filed: Sep. 29, 1997

[30] Foreign Application Priority Data

Sep. 30, 1996 [JP] Japan ................................. 8-257923

[51] Int. Cl.$^6$ ............................................. G11B 5/10
[52] U.S. Cl. ............................................. 360/128
[58] Field of Search ........................... 360/128, 69

[56] References Cited

FOREIGN PATENT DOCUMENTS

4-109417  4/1992  Japan ...................................... 360/128
5-109027  4/1993  Japan ...................................... 360/128

*Primary Examiner*—A. J. Heinz
*Attorney, Agent, or Firm*—Parkhurst & Wendel, L.L.P.

[57] ABSTRACT

This invention provides a magnetic recording and reproduction apparatus that automatically cleans the head of a rotating head cylinder sufficiently. Prior to a power-off operation at step #9, based on a detection signal from a rotary encoder for detecting a rotational position of a main cam gear at step #7a, the main cam gear is inversely rotated until it reaches a position at which a cleaner head contacts the head, and is subsequently rotated forward to move tape withdrawal posts to a loading completion position. Power is turned off at step #9. Thus, automatic cleaning is provided not only when a tape cassette is inserted and ejected but also when the power is turned off. Therefore, compared to the prior art, this invention increases the opportunities of automatic cleaning to reduce the contamination of the head of the rotating head cylinder, thereby realizing excellent recording and reproduction.

6 Claims, 8 Drawing Sheets

CLEANING SYSTEM FOR PROVIDING ADDITIONAL CLEANING FOR ROTATING CYLINDER HEADS

FIELD OF THE INVENTION

The present invention relates to the cleaning of a head attached to a rotating head cylinder of a magnetic recording and reproduction apparatus.

BACKGROUND OF THE INVENTION

To appropriately move a tape cassette, tape withdrawal posts, and a capstan pinch roller in connection with multiple modes (a cassette eject mode, a cassette lowering mode, a replay mode, a reverse replay mode, and a rapid traverse and rewind mode), conventional video tape recorders drive these components via a link mechanism that engages with a main cam gear while rotating the main cam gear using a single DC motor.

Figure 3:
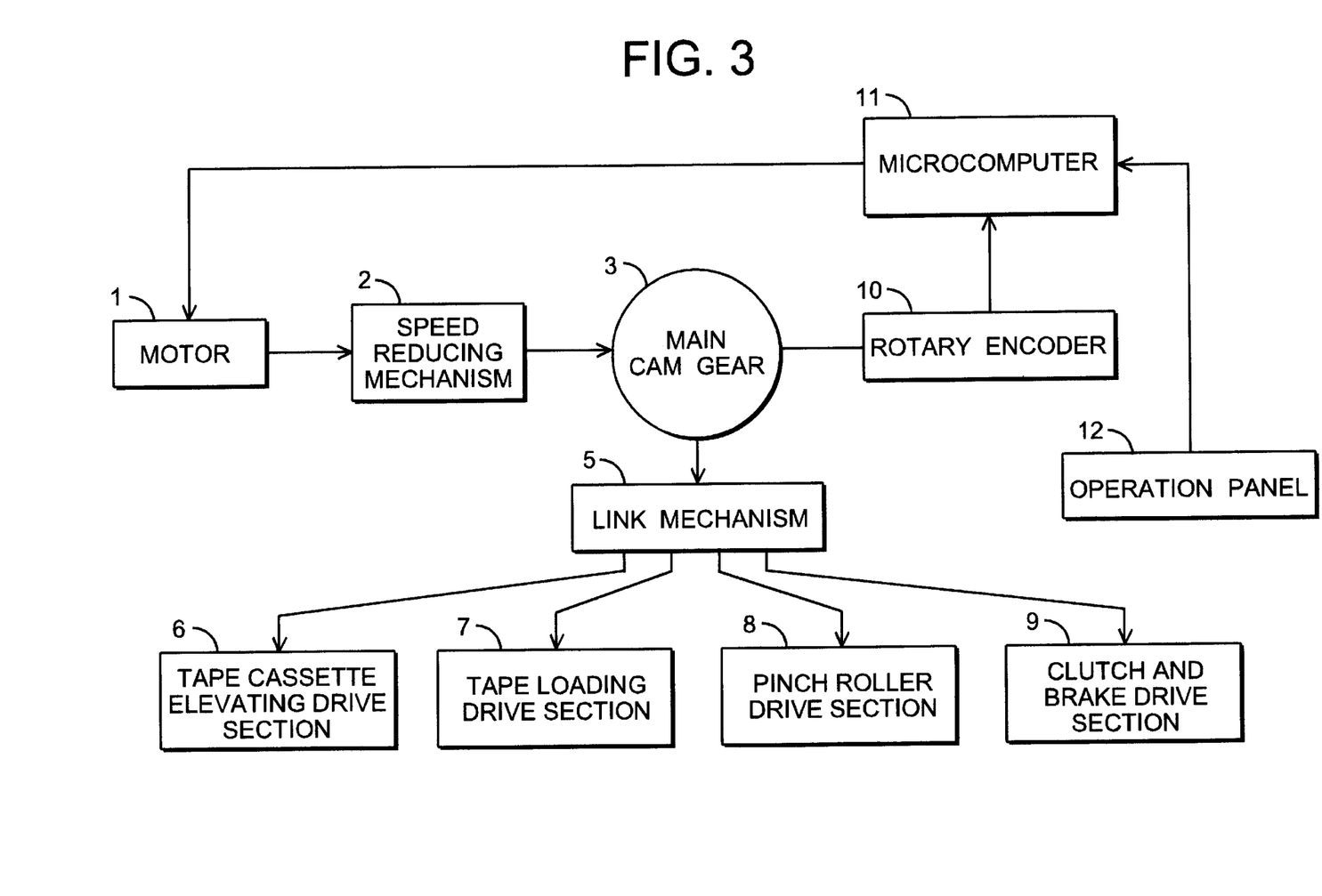
FIG. 3 shows an explanatory diagram of a power transmission system in the mechanism of the magnetic recording and reproduction apparatus.

FIG. 3 shows a structure for controlling the operation of the motor for driving the main cam gear. A DC motor 1 is coupled to a main cam gear 3 via a speed reducing mechanism 2. The main cam gear 3 is rotated to drive via a main lever 4 (see FIG. 4) that extends along a cam groove (not shown) for the main cam gear 3 and a link mechanism 5 composed of various levers and gears coupled to the main lever 4, a tape cassette elevating drive section 6, a tape loading drive section 7, a pinch roller drive section 8, and a clutch and brake drive section 9 so that they will perform an intended operation during an appropriate period of time.

A rotary encoder 10 for detecting the rotational position of the main cam gear 3 in terms of an absolute value is coupled to the main cam gear 3, and based on an instruction input from an operation panel 12 and data detected by the rotary encoder 10, a microcomputer 11 controls the turning-on and -off of the power to the motor, the polarity of the power, and the turning-on period so that the main cam gear 3 will be rotated and stopped at a rotational position corresponding to the instruction input from the operation panel 12.

Figure 4:
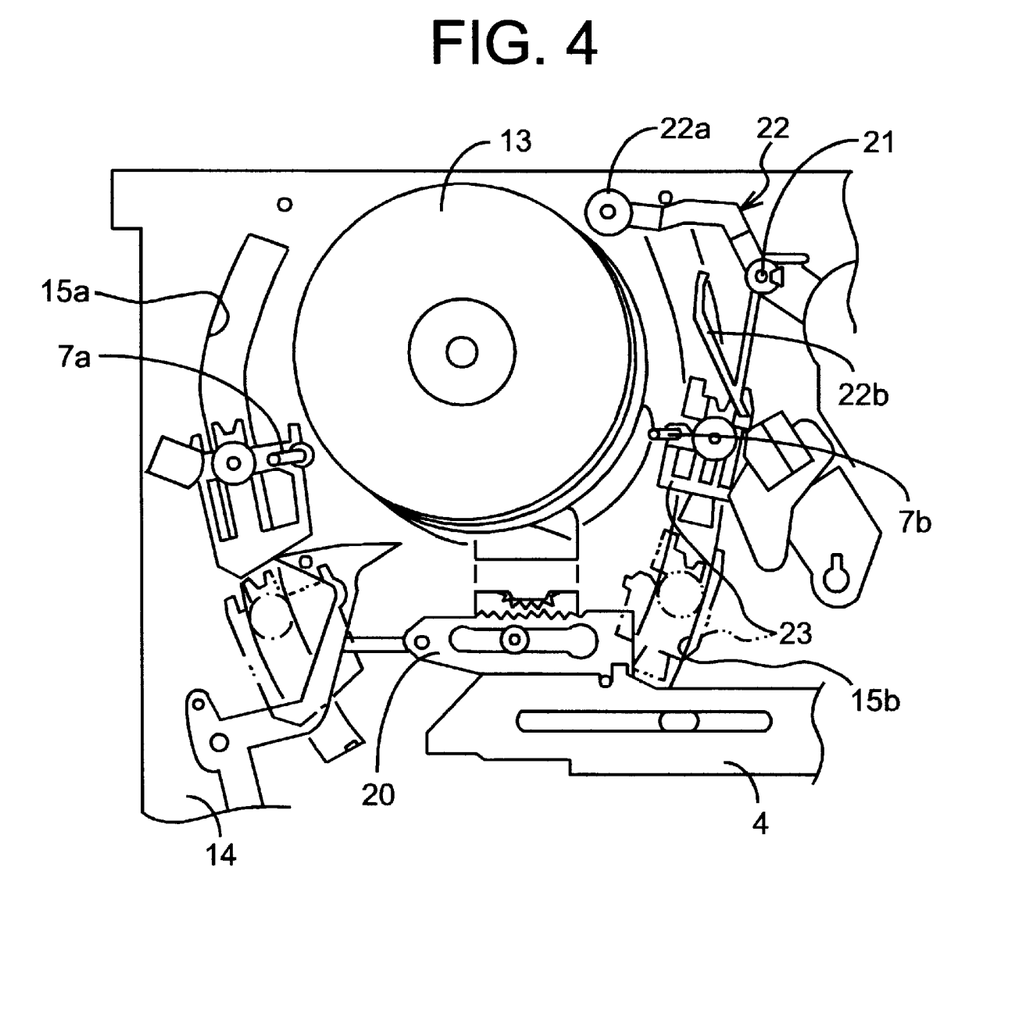
FIG. 4 shows a plan view of the integral part of this invention illustrating a state in which tape loading is being executed.
Figure 5:
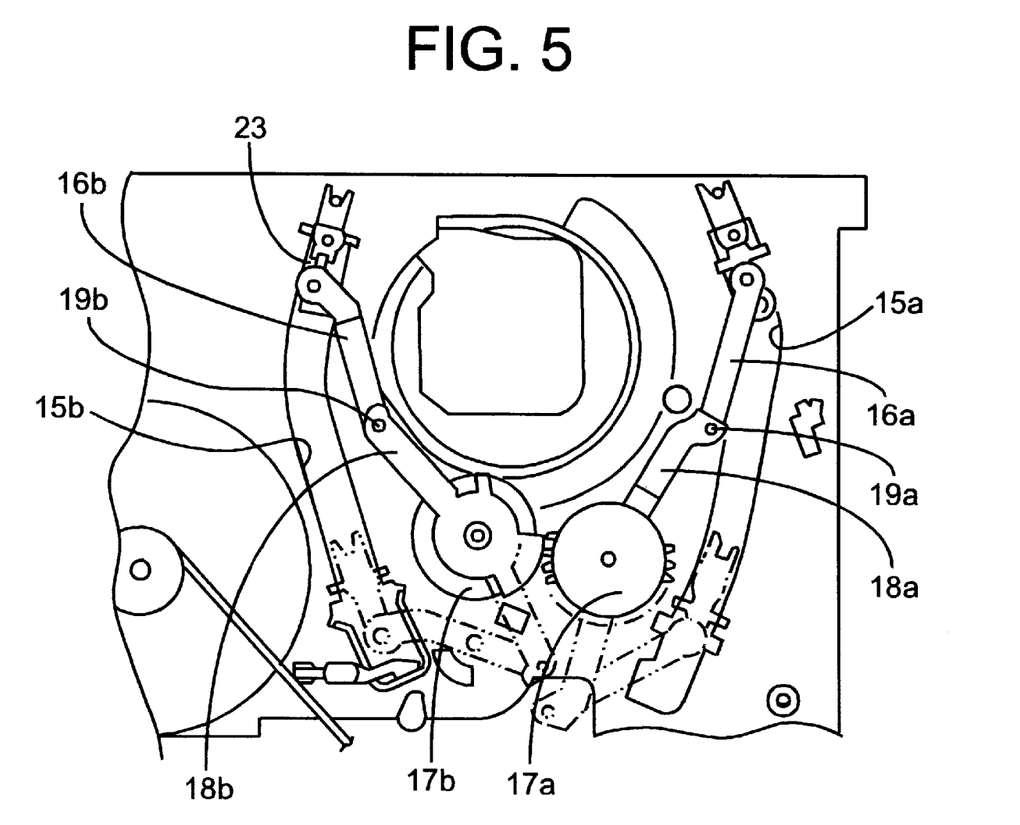
FIG. 5 is a rear view showing a state in which tape loading has been completed.

As shown in FIGS. 4 and 5, the tape loading drive section 7 that withdraws a magnetic tape from a tape cassette and winds it over a rotating head cylinder 13 including a pair of tape withdrawal posts 7a and 7b.

The tape withdrawal posts 7a and 7b engage with guide grooves 15a and 15b formed in a chassis 14 for slidable movement and are coupled to the tips of loading arms 16a and 16b shown in FIG. 5, with the proximal ends of the loading arms 16a and 16b coupled via pins 19a and 19b to levers 18a and 18b that are rotated integrally with gears 17a and 17b meshing with each other. One of the gears 17a and 17b meshes with a rack 20 (see FIG. 4) engaging with the main lever 4 so that the tape withdrawal posts 7a and 7b can be transferred between the position shown by the imaginary line in FIG. 5 and the loading completion position shown by the solid line.

A cleaner head 22 with its middle pivoted on a shaft 21 buried in the chassis 14 is installed near the rotating head cylinder 13. While the tape withdrawal posts 7a and 7b are moving from the position shown by the imaginary line to the loading completion position, a felt portion 22a at the tip of the cleaner head 22 temporarily contacts the head of the rotating head cylinder 13 for cleaning, as shown in FIGS. 4, 6, and 7.

Figure 6:
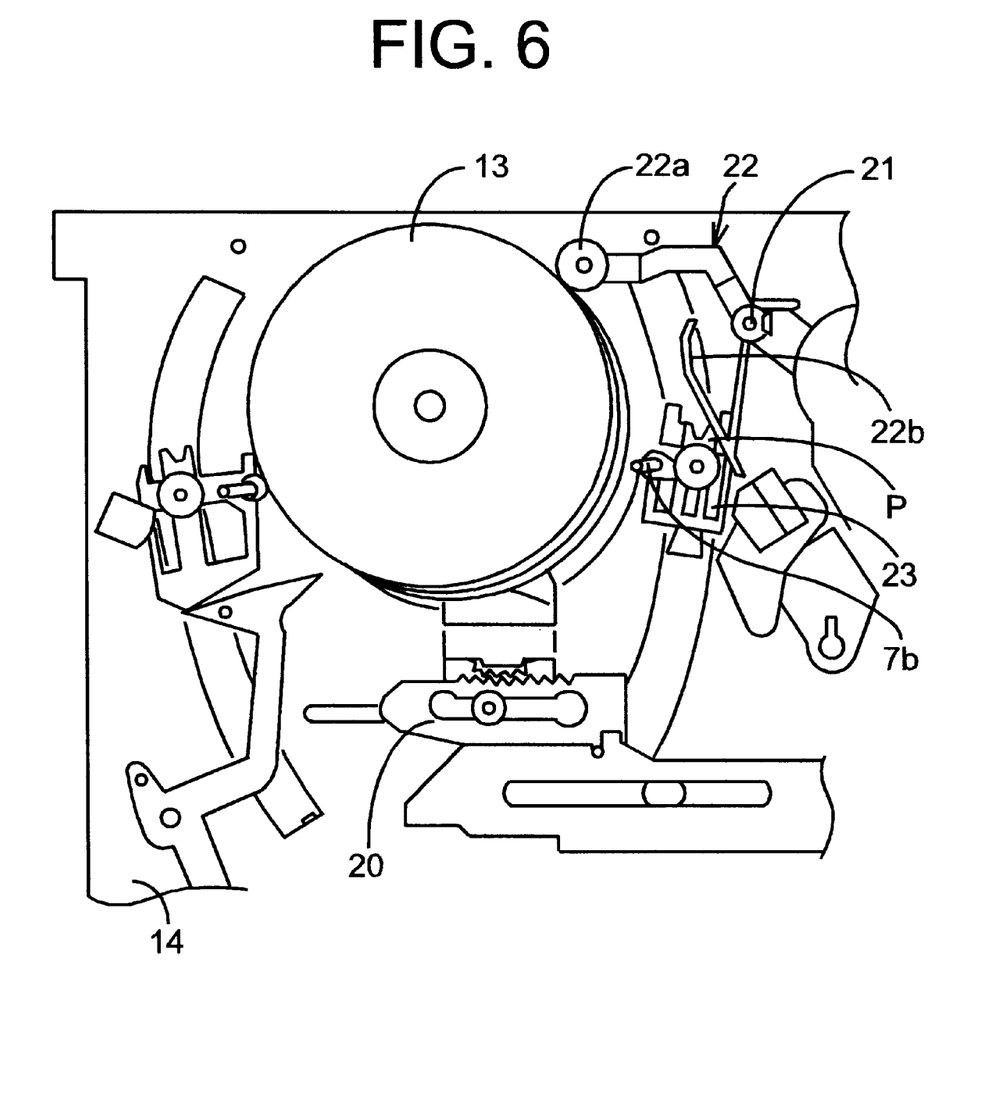
FIG. 6 is a plan view showing a state in which automatic cleaning is being executed immediately before tape loading has been completed.
Figure 7:
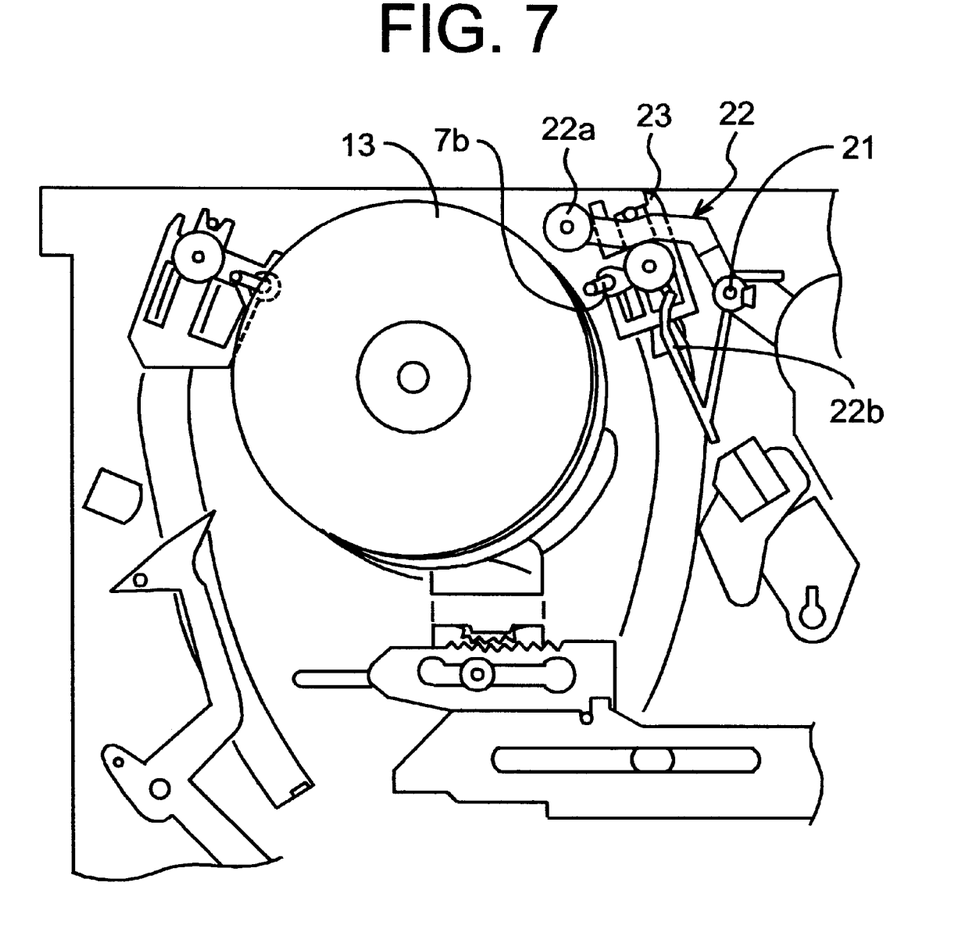
FIG. 7 is a plan view showing a state in which tape loading has been completed.

Specifically, when a boat 23 with the tape withdrawal post 7b mounted thereon contacts at a point P an elastic portion 22b formed at the proximal end of the cleaner head 22 and moves toward the loading completion position, as shown in FIG. 4, the felt portion 22a of the cleaner head 22 contacts the rotating head cylinder 13, which is rotating, under a pressing force generated by the elastic deformation of the elastic portion 22b, as shown in FIG. 6. Then, when the tape withdrawal post 7b has reached the loading completion position, as shown in FIG. 7, the felt portion 22a of the cleaner head 22 leaves the rotating head cylinder 13.

Figure 8:
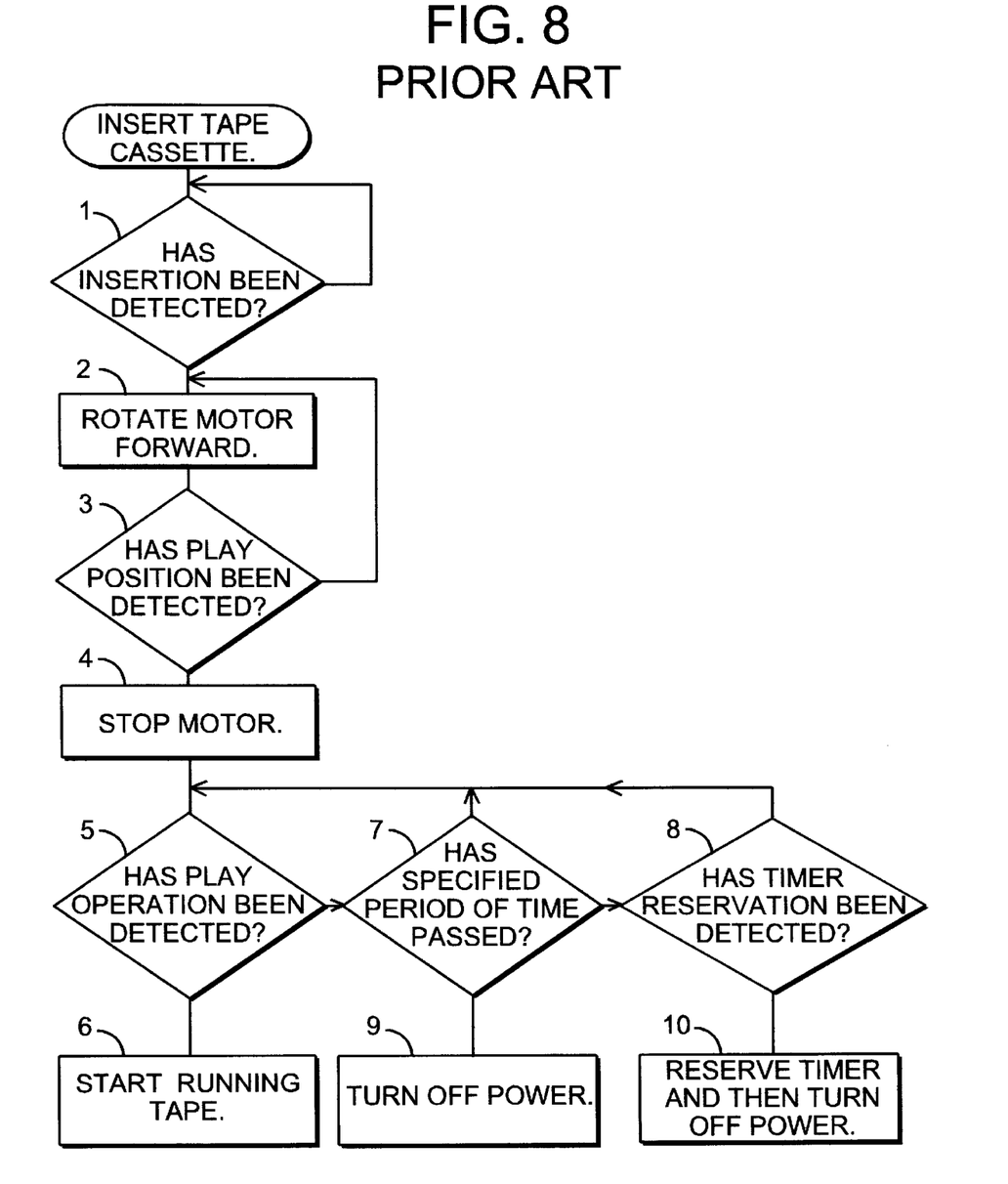
FIG. 8 shows a flowchart of the integral part of a conventional control means.

FIG. 8 shows a flowchart of the microcomputer 11 describing the operation performed when the microcomputer 11 detects the insertion of a tape cassette.

On detecting the insertion of a tape cassette at step #1, the microcomputer 11 rotates the DC motor 1 forward at step #2, and checks whether data detected by the rotary encoder 10 has reached a play position (tape loading has been finished and a magnetic tape is sandwiched between the capstan and the pinch roller).

The microcomputer repeats steps #2 and #3 until the main cam gear 3 has reached the play position, and on detecting the arrival at the play position at step #3, the microcomputer 11 turns off the power to the DC motor 1 at step #4.

At step #5, the microcomputer detects whether or not a play button in the operation panel 12 has been pressed, and if so, it rotates the capstan to start the running of the tape at step #6. Otherwise, the microcomputer executes step #7 to check whether or not a specified period of time T1 has passed since the start of step #5. If not, the microcomputer checks at #8 whether or not timer reservation has been reserved. Otherwise, the microcomputer returns to step #6.

If the operator has inserted and left the tape cassette as it is without operating the operation panel 12, the microcomputer detects the passage of the specified period of time T1 at step #7 and turns off the power at step #9 to transfer to a standby state. If the microcomputer detects a timer operation at step #8 before detecting the passage of the specified period of time T1 at #7, it reserves the timer, turns off the power, and transfers to the standby state at step #10.

In such a conventional configuration, when the tape cassette is inserted, the cleaner head 22 contacts and automatically cleans the rotating head cylinder 13 in steps #1 to #4. Automatic cleaning is also provided when an eject command is issued from the operation panel 12.

Despite such cleaning of the head of the rotating head cylinder 13 using the cleaner head 22, degraded recording and reproduction may be caused by the contamination of the head of the rotating head cylinder 13.

SUMMARY OF THE INVENTION

It is an object of this invention to provide a magnetic recording and reproduction apparatus that can automatically clean the head of a rotating head cylinder 13 sufficiently compared to the prior art.

A magnetic recording and reproduction apparatus according to this invention is characterized in that, prior to a power-off operation, it moves a cleaner head to a position at which it contacts the head of a rotating head cylinder in order to execute cleaning, and turns off power after the cleaning has been finished.

This invention can automatically clean the head of the rotating head cylinder sufficiently.

According to an embodiment, this invention provides a magnetic recording and reproduction apparatus that winds around a rotating head cylinder a magnetic tape withdrawn from a tape cassette for recording and reproduction, characterized in that the apparatus comprises a cleaner head rotatably pivoted at a position at which the cleaner head contacts the head of the rotating head cylinder and contacting the head in response to the withdrawal of the magnetic tape from the tape cassette, so that prior to a power-off operation, the cleaner head is moved to a position at which it contacts the head in order to execute cleaning, and that a control means is configured to turn off power after cleaning has been finished. Thus, automatic cleaning is provided not only when the tape cassette is inserted and ejected but also when the power is turned off.

According to another aspect of the invention, after a pair of tape withdrawal posts are moved along a cam groove in a main cam gear to wind around a rotating head cylinder a magnetic tape withdrawn from a tape cassette, a cleaner head contacts the neighborhood of the tape withdrawal posts and the head of the rotating head cylinder from the time immediately before the tape withdrawal posts reach a loading completion position until they reach the loading completion position.

Another aspect of the invention is characterized in that the apparatus comprises a rotary encoder for detecting a rotational position of the main cam gear and control means configured to turn off the power, based on a detection signal from the rotary encoder, with the main cam gear having been inversely rotated until the cleaner head contacts the head. Thus, the cleaner head of the tape withdrawal posts contacts and automatically cleans the head not only when a tape cassette is inserted and ejected but also when the power is turned off.

Yet another aspect of the invention is characterized in that, in claim 2, the control means is configured to provide a specified time interval before turning off the power.

A magnetic recording and reproduction apparatus according to claim 4 is characterized in that the control means is configured so as not to turn off the power when the main cam gear has been inversely rotated until the cleaner head contacts the head but to turn off the power thereafter when the main cam gear has been rotated forward subsequently until the tape withdrawal posts have moved to the loading completion position.

In another aspect of the invention the apparatus comprises a rotary encoder for detecting a rotational position a of the main cam gear and control means configured to turn off the power, based on a detection signal from the rotary encoder, after the main cam gear has been inversely rotated until the cleaner head passes the position at which it contacts the head. Thus, not only when a tape cassette is inserted and ejected but also when the power is turned off, the cleaner head of the tape withdrawal posts contacts and automatically cleans the head.

According to another aspect of the invention the control means is configured so as not to turn off the power when the main cam gear has been inversely rotated until the cleaner head passes a position at which the cleaner head contacts the head but to turn off the power thereafter when the main cam gear has been rotated forward subsequently until the tape withdrawal posts have moved to the loading completion position.

As described above, this invention provides a magnetic recording and reproduction apparatus that winds around a rotating head cylinder a magnetic tape withdrawn from a tape cassette for recording and reproduction, characterized in that: the apparatus includes a cleaner head rotatably pivoted at a position at which the cleaner head contacts the head of the rotating head cylinder and contacting the head in response to the withdrawal of the magnetic tape from the tape cassette; prior to a power-off operation, the cleaner head is moved to a position at which the cleaner head contacts the head in order to execute cleaning; and a control means is configured to turn off power after cleaning has been finished. Thus, automatic cleaning is provided not only when a tape cassette is inserted and ejected but also when the power is turned off. Therefore, compared to the prior art, this invention increases the opportunities of automatic cleaning to reduce the contamination of the head of the rotating head cylinder, thereby realizing excellent recording and reproduction.

DESCRIPTION OF THE EMBODIMENTS

Embodiments of this invention are described below with reference to FIGS. 1 and 2.

The configuration of the mechanism is the same as in FIGS. 4 to 7 except the specific configuration of a microcomputer 11 as a control means. Thus, the same reference numerals as in those figures are used in the following description.

Embodiment 1

Figure 1:
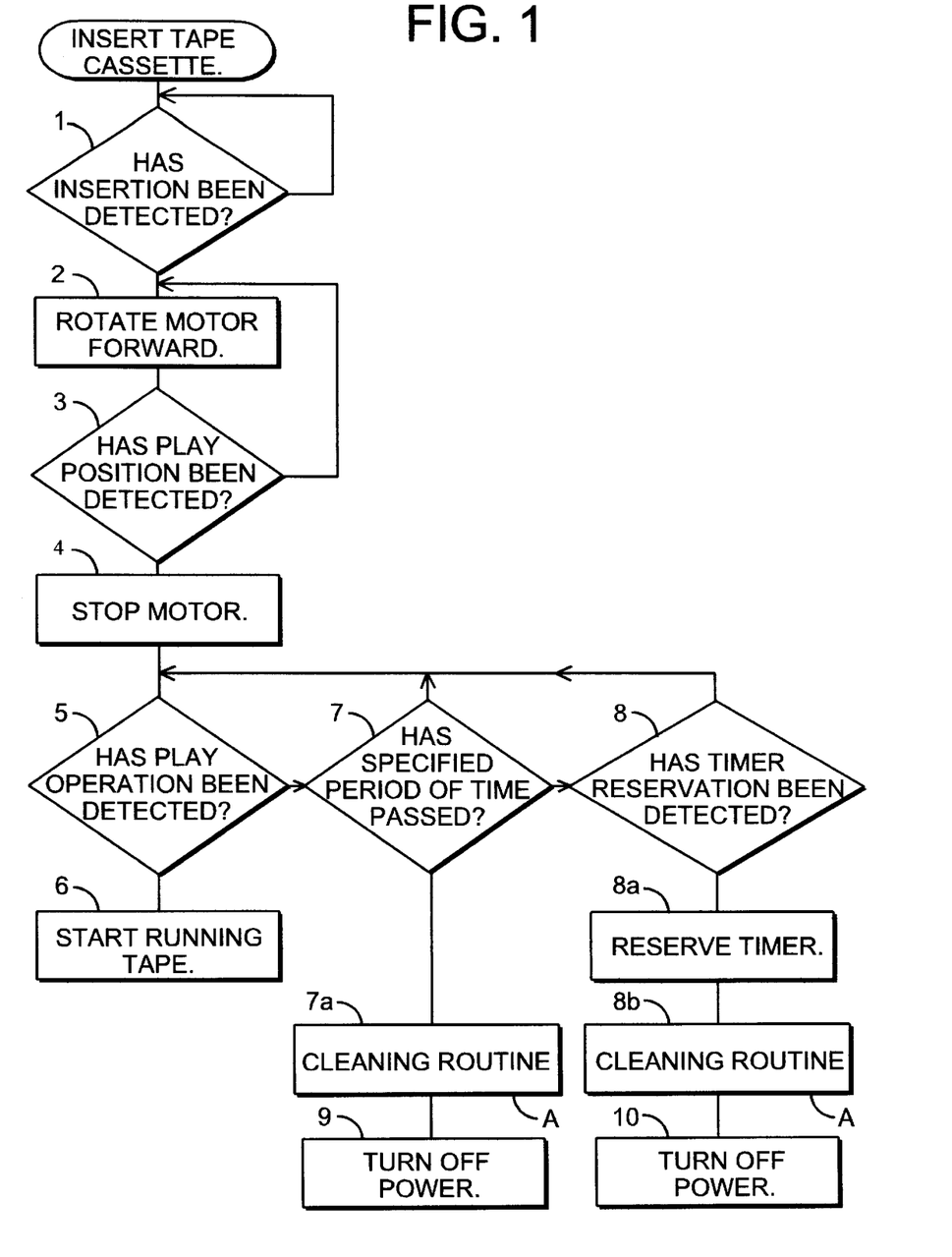
FIG. 1 shows a flowchart of the integral part of a magnetic recording and reproduction apparatus according to this invention.

FIG. 1 shows the configuration of a microcomputer 11 in a magnetic recording and reproduction apparatus according to Embodiment 1. In FIG. 1, a cleaning routine A is provided between step #7 and step #9 as step #7a and also provided between step #8 and step #10 as step #8b. Other steps are the same as in FIG. 8.

Figure 2:
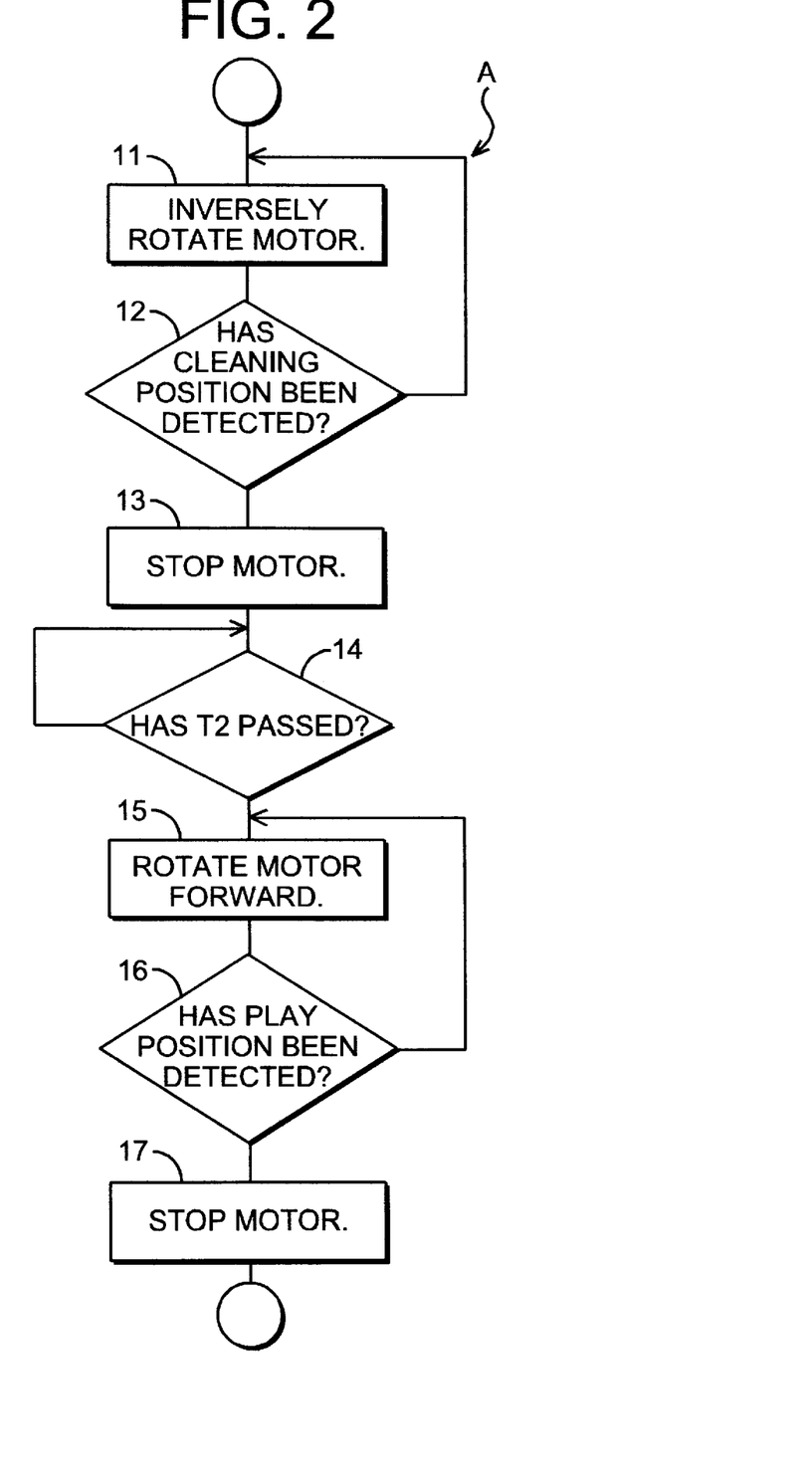
FIG. 2 shows a block diagram of a cleaning routine in Embodiment 1.

Cleaning routine A executed in steps #7a and #8b is configured as shown in FIG. 2.

According to this configuration, automatic cleaning is provided not only when a tape cassette is inserted and ejected, but also when a tape cassette is inserted and left alone without operating an operation panel 12, the cleaning routine A is executed at step #7a when the passage of a specified period of time T1 has been detected at step #7.

Cleaning routine A inverts the rotation of a DC motor 1 at step #11. Based on data detected by a rotary encoder 10, step #12 checks whether or not a main cam gear 3 has rotationally moved to a rotational position (a cleaning position) shown in FIG. 6 at which a felt portion 22a of a cleaner head 22 contacts the head of a rotating head cylinder 13.

If it is determined at step #12 that the main cam gear 3 has not reached the cleaning position, step #11 is repeated.

Otherwise, step #13 is executed to stop the DC motor 1. Step #14 detects the passage of a specified period of time T2.

Thus, at step #14, the cleaning routine A contacts the felt portion 22a of the cleaner head 22 with the head of the rotating head cylinder 13 over the specified period of time T2.

When the passage of the specified period of time T2 is detected at step #14, the DC motor 1 is rotated forward at step #15, and based on data detected by the rotary encoder 10, it is checked at step #16 whether or not the main cam gear 3 has rotationally moved to a play position shown in FIG. 7 at which the felt portion 22a of the cleaner head 22 leaves the head of the rotating head cylinder 13.

If it is determined at step #16 that the main cam gear 3 has not reached the play position, step #15 is repeated. Otherwise, step #17 is executed to stop the DC motor 1.

Then the cleaning routine A is put an end to and the power is turned off for effecting auto power-off at step #9.

If a timer operation is detected at step #8 prior to the detection of the passage of the specified period of time T1 at step #7, a timer is reserved at step #8a and the cleaning routine A is then executed at step #8b. As in the cleaning routine A in step #7a, this cleaning routine A provides automatic cleaning over the specified period of time T2 at step #14 and turns off the power to enter a standby state for a reserved recording time.

As described above, Embodiment 1 provides automatic cleaning not only when a tape cassette is inserted and ejected but also over the specified period of time T2 by executing steps #7a or #8b. Thus, compared to the prior art, this embodiment increases the opportunities of automatic cleaning to reduce the contamination of the head of the rotating head cylinder 13, thereby realizing excellent recording and reproduction.

Embodiment 2

Although the cleaning routine A detects a cleaning position at step #12 and then executes steps #13 and #14 in Embodiment 1, the inverse rotation of the DC motor 1 may be stopped when the main cam gear has passed the cleaning position shown in FIG. 6 and reached, for example, the position shown in FIG. 4, or the motor may be immediately rotated forward until the tape withdrawal posts 7a and 7b have passed the cleaning position shown in FIG. 6 and moved to the play position shown in FIG. 7, thereby finishing the cleaning routine A. Compared to the prior art, Embodiment 2, too, is capable of increasing the opportunities of automatic cleaning to reduce the contamination of the head of the rotating head cylinder 13, thereby realizing excellent recording and reproduction.

Embodiment 3

Although Embodiments 1 and 2 execute the cleaning routine A and then steps #15 and #16 and turn off the power at step #9 or #10 to enter a standby state, the cleaning routine A in Embodiment 3 may be executed to stop the tape withdrawal posts 7a and 7b as shown in FIG. 4 or 6 and then turn off the power thereby to enter the standby state, wherein when the power is recovered, the tape withdrawal posts 7a and 7b are returned to the play position before the start of operation. Compared to the prior art, Embodiment 3 also increases the opportunities of automatic cleaning to reduce the contamination of the head of the rotating head cylinder 13, thereby realizing excellent recording and reproduction.

We claim:

1. In a magnetic recording and reproducing apparatus that comprising a cleaner head being pivotable from an initial position to a cleaning position during a loading function, and wherein a magnetic tape withdrawn from a cassette is windable around a rotating cylinder head, and the cleaner head is adapted for contact with the rotating cylinder head to perform a cleaning function, and a control means capable of detecting and controlling the movement of the cleaner head away from the rotating cylinder head, and the control means being adapted to power off the apparatus if at least one of a play mode is undetected after a predetermined time interval and that a timer reservation has been detected, the improvement comprising:

the control means being adapted to move the cleaner head to the cleaning position to contact and clean the rotating cylinder head prior to the control means powering off the apparatus subsequent to the detection of at least one of a predetermined time interval subsequent to a tape loaded status and detection of a timer reservation status.

2. In a magnetic recording and reproduction apparatus comprising a pair of tape withdrawal posts mountable on a boat that is movable through a cam groove in a main cam gear controllable by a motor and adapted to wind a tape withdrawn from a cassette around a rotating cylinder head, and wherein a cleaner head that has an elastic portion in contact with the boat having the tape withdrawal posts mounted thereon, and the cleaner head is adapted for contact with the rotating cylinder head while the boat is movable toward a loading completion position during a time period until the tape withdrawal posts reach the loading completion position, the improvement comprising:
a rotary encoder for detecting a rotational position of the main cam gear; and
a control means adapted to turn off the power, based on receipt of a detection signal emitted by said rotary encoder, and subsequent to the motor controlling the main cam gear being inversely rotated until the main cam gear has reached a position at which the cleaner head contacts the rotating cylinder head.

3. In a magnetic recording and reproduction apparatus comprising a pair of tape withdrawal posts mountable on a boat that is movable through a cam groove in a main cam gear controllable by a motor and adapted to wind a tape withdrawn from a cassette around a rotating cylinder head, and wherein a cleaner head that has an elastic portion in contact with the boat that has the tape withdrawal posts mounted thereon, and the cleaner head is adapted for contact with the rotating cylinder head while the boat is movable toward a loading completion position during a time period until the tape withdrawal posts reach the loading completion position, the improvement comprising:
a rotary encoder for detecting a rotational position of the main cam gear; and
a control means adapted to turn off the power, based on receipt of a detection signal emitted from said rotary encoder, and subsequent to a specified period of time after the motor controlling the main cam gear has been inversely rotated until the main cam gear reaches a position at which the cleaner head is in contact with the rotating cylinder head.

4. In a magnetic recording and reproduction apparatus comprising a pair of tape withdrawal posts mountable on a boat that is movable through a cam groove in a main cam gear controllable by a motor and adapted to wind a tape withdrawn from a cassette around a rotating cylinder head, and wherein a cleaner head that has an elastic portion in contact with the boat having the tape withdrawal posts mounted thereon, and the cleaner head is adapted for contact with the rotating cylinder head while the boat is movable toward a loading completion position during a time period until the tape withdrawal posts reach the loading completion position, the improvement comprising:

a rotary encoder for detecting a rotational position of the main cam gear; and a control means adapted to turn off the power after detecting that the motor controlling the main cam gear is inversely rotated until the main cam gear reaches a position at which the cleaner head contacts the rotating cylinder head, and said control means subsequently detects based on a detection signal emitted from said rotary encoder, that the motor controlling the main cam gear has been subsequently rotated forward to move the tape withdrawal posts to the loading completion position.

5. In a magnetic recording and reproduction apparatus comprising a pair of tape withdrawal posts mountable on a boat that is movable through a cam groove in a main cam gear controlled by a motor and adapted to wind a tape withdrawn from a cassette around a rotating cylinder head, and wherein a cleaner head that has an elastic portion in contact with the boat having the tape withdrawal posts mounted thereon, and the cleaner head is adapted for contact with the rotating cylinder head while the boat is movable toward a loading completion position during a time period until the tape withdrawal posts reach the loading completion position, the improvement comprising:

a rotary encoder for detecting a rotational position of the main cam gear; and a control means adapted to turn off the power, based on a detection signal emitted from said rotary encoder, after the motor controlling the main cam gear is inversely rotated until the main cam gear passes a position at which the cleaner head contacts the rotating cylinder head.

6. In a magnetic recording and reproduction apparatus comprising a pair of tape withdrawal posts mountable on a boat that is movable through a cam groove in a main cam gear controllable by a motor and adapted to wind a tape withdrawn from a cassette around a rotating cylinder head, and wherein a cleaner head that has an elastic portion in contact with the boat having the tape withdrawal posts mounted thereon, and the cleaner head is adapted for contact with the rotating cylinder head while the boat is movable toward a loading completion position during a time period until the tape withdrawal posts reach the loading completion, the improvement comprising:

a rotary encoder for detecting a rotational position of the main cam gear; and a control means adapted to turn off the power after the motor controlling the main cam gear is inversely rotated until the main cam gear passes a position at which the cleaner head contacts the rotating cylinder head, and said control means subsequently detects based on a detection signal emitted from said rotary encoder, that the motor controlling the main cam gear is subsequently rotated forward to move the tape withdrawal posts to the loading completion position.

\* \* \* \* \*